United States Patent [19]
Schwenke

[11] 3,874,267
[45] Apr. 1, 1975

[54] METHOD AND MACHINE FOR ACCURATE FORMATION OF TEETH ON ELLIPTICAL GEARS

[76] Inventor: Dieter Schwenke, Dunenweg 27, 205 Hamburg 80, Germany

[22] Filed: May 14, 1973

[21] Appl. No.: 360,133

[30] Foreign Application Priority Data
May 13, 1972 Germany.............................. 2223507

[52] U.S. Cl...................................... 90/4, 90/13 C
[51] Int. Cl............................................ B23f 15/02
[58] Field of Search ..................... 90/4, 7, 8, 3, 13 C

[56] References Cited
UNITED STATES PATENTS
2,736,239  2/1956  Higashi et al............................. 90/3
3,651,737  3/1972  Aoyama et al............................ 90/8

FOREIGN PATENTS OR APPLICATIONS
1,190,769  4/1963  Germany.................................. 90/4

Primary Examiner—Gil Weidenfeld
Attorney, Agent, or Firm—Michael S. Striker

[57] ABSTRACT

A machine for cutting teeth on elliptical gear blanks has a rotary work holder for blanks which is mounted on a first carriage movable in the direction of the x-axis of a two-dimensional coordinate system. The first carriage is movable relative to and is mounted on a second carriage which is movable on the bed in the direction of the y-axis of the coordinate system. The cutting tool is driven to perform exclusively material removing movements. A first drive rotates the work holder at a periodically varying angular speed, and two additional drives respectively move the first and second carriages in synchronism with the angular speed of the work holder so that the pitch ellipse of a blank on the work holder travels at a constant speed along the point of contact with a pitch line of the cutting tool and that the pitch line is always tangential to the pitch ellipse at the point of contact.

22 Claims, 13 Drawing Figures

METHOD AND MACHINE FOR ACCURATE FORMATION OF TEETH ON ELLIPTICAL GEARS

BACKGROUND OF THE INVENTION

The present invention relates to a method of forming gear teeth on elliptical blanks whose configuration is determined by the length of the major axis $c$ and the numerical eccentricity $\epsilon$, and according to which a gear cutting tool is driven to perform only material removing movements and the elliptical blank is driven to perform rotary movements as well as to change its position relative to the cutting tool.

The invention also relates to a gear cutting machine for the formation of gear teeth on elliptical gear blanks whose configuration is determined by the length of their major axis $c$ and their numerical eccentricity $\epsilon$, whereby a cutting tool of the gear cutting machine is driven to perform exclusively material removing movements and the work holder for an elliptical gear blank is associated with drive means which serve to rotate the work holder as well as to change the position of the work holder relative to the cutting tool.

Elliptical gears can be used with advantage in transmissions having an irregularly varying ratio (for example, in packing and textile machines, progressive steering gearings, etc.). In spite of their advantages, elliptical gears are used rather infrequently because their manufacture in accordance with the presently known techniques involves extremely high expenditures and their quality, as regards the accuracy and rolling qualities, is not comparable to that of normal gears.

At the present time, elliptical gears are produced mainly by hobbing. Thus, it is known to provide a gear cutting machine with a hand-made elliptical pitch wheel as a substitute for the customary circular pitch wheel. The shape and the number of gear teeth on the elliptical pitch wheel depend on the desired form and number of gear teeth on the elliptical gear. A worm which drives the elliptical pitch wheel is mounted for radial movement with reference to the axis of the elliptical wheel so that it can remain in mesh therewith when the elliptical wheel rotates and that it can drive the elliptical wheel at a varying speed. Such radial movability of the worm entails improper mesh with the elliptical wheel which affects the quality of elliptical gears. Changes in the distance between the cutting tool and the center of the elliptical blank are effected in dependency on movements of a suitable disk-shaped template. The slide which supports the cutting tool is biased against the template by hydraulic means or under the action of springs. Such mode of producing elliptical gears, especially short runs of elliptical gears, is extremely expensive because a discrete elliptical pitch wheel and a discrete template must be prepared by hand for each and every size and shape of elliptical gears.

Another known machine for the cutting of gears on elliptical gear blanks employs a circular pitch wheel which is driven by a worm. The latter is movable axially by means of a cam to thereby change the rotational speed of the circular pitch wheel. Changes in the distance between the cutting tool and the center of the elliptical blank are effected by moving the cutting tool through the intermediary of an adjustable eccentric and by changing the rotational speed of the eccentric by way of a control cam. This method of making elliptical gears is also extremely expensive because a set of discrete control cams must be produced for each and every shape and size of elliptical gears. Reference may be had to German Pat. No. 1,013,494.

A careful study of the above outlined conventional techniques for the making of elliptical gears leads to the conclusion that they cannot insure accurate formation of teeth on such gears. Accurate formation of teeth on elliptical gear blanks can be insured if, at each gear cutting point, the pitch ellipse of the elliptical gear blank remains tangential to the pitch line of the cutting tool. However, when an elliptical gear blank rotates, the position of the tangent at the cutting point changes continuously. It was found that the presently known techniques can be used to produce elliptical gears within acceptable tolerances only if the numerical eccentricity of elliptical gears is very small.

German Pat. No. 573,161 discloses a transmission which can be used in a gear cutting machine for reasonably accurate cutting of teeth on elliptical gears. The operation of the transmission is based on the premise that the pitch mantle of the cutting tool should remain tangential to the pitch ellipse of the elliptical blank at the point of contact between the blank and the tool, and that the angular speed of the blank must be controlled in such a way that, relative to its axial rotary movement, the cutting tool must travel along the periphery of the pitch ellipse at a constant rate. This is proposed to be accomplished by driving the elliptical blank at a varying angular speed, by guiding the tool for movement along a circular path having a diameter corresponding to the minor axis of the ellipse, and by moving the cutting tool back and forth in order to maintain it in tangential contact with the blank. The disclosure of the German Pat. No. 573,161 emphasizes that the translatory movement of cutting tool relative to its angular movement only approximates a constant rate. Thus, a highly accurate formation of gear teeth on an elliptical blank, such as is desirable in transmissions, is not realizable with the machine of this German patent. Furthermore, the dual guidance of the cutting tool presents serious problems because it constitutes a radical departure from conventional procedure in the construction of machine tools according to which the tool merely performs cutting movements and the blank is guided for various movements with respect to the tool.

SUMMARY OF THE INVENTION

An object of the invention is to provide a method and an apparatus for machining on eliptical blanks gear teeth with the same degree of accuracy and as economically as on circular gear blanks.

Another object of the invention is to provide a novel and improved method of providing elliptical blanks of any practical size and/or shape with accurately finished gear teeth in a time-saving operation.

A further object of the invention is to provide a novel and improved machine for cutting gear teeth on elliptical blanks.

In accordance with the method of the present invention, an elliptical blank is driven at a periodically varying angular speed and the position of the elliptical blank with reference to the cutting tool is changed in synchronism with the angular movement of the elliptical blank in the direction of the axes of a two-dimensional coordinate system in such a way that a pitch ellipse of the elliptical blank travels along the point of contact with the pitch line of the cutting tool at a constant speed and that the pitch ellipse of the blank remains tangential to the pitch line of the cutting tool at the point of contact.

Based on the aforementioned characteristic dimensions of an elliptical blank, namely, the length of the major axis $c$ and the numerical eccentricity $\epsilon$, one can calculate the mathematical relationships for the rotary movements and for changes in the position of the elliptical blank. In accordance with a further feature of the method, a rotary driving movement at a constant angular speed $\omega\alpha$ is converted into a rotary movement at a periodically varying angular speed $\omega\phi$ for rotation of the elliptical blank as a function of its numerical eccentricity according to the equation $$\omega\phi = \frac{\sqrt{1-\epsilon^2}}{1-[1-\sqrt{1-\epsilon^2}]\sin^2\beta}\omega\alpha,$$

where $\beta$ is the angle between the major axis $c$ of an elliptical blank and a line which is normal to the pitch line. The position of the elliptical blank in the direction of a first axis $y$ of the two-dimensional coordinate system (which first axis is normal to the pitch line of the cutting tool) and in the direction of a second axis $x$ of the coordinate system (which second axis is parallel to the pitch line of the cutting tool) is changed as a function of the numerical eccentricity $\epsilon$, the length of the major axis $c$ and the angular speed $\omega\alpha$ of the driving rotary movement whereby the change of position in the direction of the first axis $y$ satisfies the equation $$y = \frac{c}{2}(1-[1-\sqrt{1-\epsilon^2}]\sin^2\beta$$

and the change of position in the direction of the second axis $x$ satisfies the equation $$x = 2r_1\sin(2\beta)\,[1 - k\cos(2\beta)].$$

Another mode of realizing the aforediscussed angular movement and positional changes of the elliptical blank can be achieved in accordance with a modification of the just outlined method in that a first rotary driving movement at a constant angular speed $\omega\alpha$ is mechanically converted into a second rotary movement of the elliptical blank at a periodically varying angular speed $\omega\phi$ and that the first rotary movement is mechanically converted into straight-line movements of the elliptical blank relative to the cutting tool. One possibility of realizing the just mentioned rotary movements and positional changes of the elliptical blank is achieved, in accordance with a further feature of the method, in that the rotary movement of the blank at a periodically varying angular speed $\omega\beta$ and the changes in position of the blank in the directions of the first axis $y$ and second axis $x$ of the coordinate system are brought about by furnishing rated value signals in digital form. In accordance with a further feature of the method, the rated value signals are furnished by a computer in the form of a transmission.

The improved gear cutting machine comprises drive means arranged to rotate a work holder for an elliptical gear blank at a periodically varying angular speed and to change the position of the work holder in the direction of a first axis $y$ and a second axis $x$ of a two-dimensional coordinate system in such a way that a pitch ellipse of the elliptical blank travels along the point of contact with a pitch line of the cutting tool at a constant speed and that the pitch ellipse of the elliptical blank remains tangential to the pitch line of the cutting tool at the point of contact.

In accordance with an embodiment of the invention which takes into consideration the mathematical relationships for exact tooth formation, a first drive for rotating the work holder is constructed in such a way that a rotary driving movement of the prime mover of the machine at a constant angular speed $\omega\alpha$ is converted into a rotary movement at a periodically varying angular speed $\omega\phi$ as a function of numerical eccentricity $\epsilon$ of the elliptical blank according to the equation $$\omega\phi = \frac{\sqrt{1-\epsilon^2}}{1-[1-\sqrt{1-\epsilon^2}]\sin^2\beta}\omega\alpha,$$

and a second and third drive for respectively changing the position of the work holder relative to the cutting tool in the direction of the first axis $y$ of the coordinate system (which axis is normal to a pitch line of the cutting tool) and in the direction of the second axis $x$ of the coordinate system (which second axis is parallel to the pitch line of the cutting tool) as a function of numerical eccentricity $\epsilon$ of the elliptical blank, as a function of the length of the major axis $c$ of the elliptical blank, and as a function of the angular speed $\omega\alpha$ of the prime mover, are constructed in such a way that the position of the work holder relative to the cutting tool can be varied in accordance with the equations $$y = \frac{c}{2}(1-[1-\sqrt{1-\epsilon^2}]\sin^2\beta), \text{ and}$$

$$x = 2r_1\sin(2\beta)[1-k\cos(2\beta)].$$

In accordance with a further feature of the machine, changes in the position of the work holder in the direction of the axes $y$ and $x$ of the coordinate system are effected by mounting the work holder in a first carriage which is movable on a second carriage in the direction of the second axis $x$ and by mounting the second carriage on the bed of the machine for movement in the direction of the first axis $y$. In one presently preferred embodiment of the gear cutting machine, the three drive means are adjusting elements of control units which receive rated value signals in digital form to rotate the work holder and to change the positions of both carriages. In accordance with a further feature of the invention, the rated value signals are furnished by a program carrier. The determination of rated values and their storage in the program carrier are effected, in accordance with a further feature of the invention, by employing a mechanical computer which is connected with a data supplying unit for the program carrier. In accordance with another embodiment of the invention, the work holder is associated with a positive mechanical transmission which receives motion from the prime mover and consists of several kinematically interconnected drives which serve as a means for rotating the work holder as well as for moving the first and second carriages. A first drive of the positive mechanical transmission serves to rotate the work holder at the periodically varying angular speed and can be mounted on the first carriage to constitute an infinitely variable speed gearing whose output element is kinematically connected with the work holder. A second drive of the positive mechanical transmission can serve to change the position of the work holder along the first axis y of the coordinate system and may constitute an eccentric drive which is mounted in the first carriage and has an eccentric extending into a guide provided in the bed of the machine. A third drive of the positive mechanical transmission can move the work holder along the second axis x of the coordinate system and may constitute a planetary which is mounted in the first carriage and may include a fixedly mounted sun gear and a planet pinion which constitutes a first eccentric arranged to roll along the sun gear and carrying a second eccentric which extends into a guide of the second carriage. The means for regulating the operation of the infinitely variable speed gearing may include an eccentric drive which is operated by the second drive of the positive mechanical transmission and is connected with an adjuster for the infinitely variable speed gearing.

As a result of changes in the position of the work holder relative to the cutting tool, the speed at which the pitch ellipse of the elliptical blank moves along the cutting tool also changes since the rotary gear transmission maintains the peripheral speed of the pitch ellipse at the cutting point at a constant value only because of the shape of the ellipse. Therefore, the work holder may be associated with a compensating gearing which controls the angular movements of the work holder as a function of its changes in position relative to the cutting tool.

In order to facilitate the formation of gear teeth on elliptical blanks having major axes $c$ of different lengths and different numerical eccentricities $\epsilon$, the eccentricities of eccentrics of the drives forming part of the positive mechanical transmission are adjustable and the distance between the guide for the eccentric of the second drive and the cutting tool is also adjustable.

For determination of rated values for a digitally controlled gear cutting machine by means of a mechanical computer, the latter consists of a positive mechanical drive (which corresponds to the positive mechanical drive of the gear cutting machine) and of measured value recorders which are connected with the data supplying unit.

It is to be understood that the present invention can be embodied in gear cutting machines which operate in accordance with the hobbing technique as well as in gear cutting machines operating on the gear shaping principle. In the second case, and in order to employ terms which are applicable for both types of operations, the expression "pitch line" of the cutting tool is intended to denote an imaginary tangent to the pitch circle of the shaping tool at the point of contact between the pitch ellipse of the elliptical blank and the pitch circle of the shaping tool.

The novel features which are considered as characteristic of the invention are set forth in particular in the appended claims. The improved gear cutting machine itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

The mathematical relationships underlying the improved method and machine for accurate shaping of teeth on elliptical gear blanks will be discussed with reference to FIGS. 1a to 1g.

Economical production of elliptical gears with a presently required high degree of accuracy necessitates that 1. the pitch ellipse should always remain tangential to the cutting tool at the point where the tool removes material from an elliptical gear blank;
2. the once determined cutting point should remain unchanged for the entire gear cutting operation, the same as in the manufacture of gears having a circular pitch line; and
3. the pitch ellipse should pass through the cutting point at a constant speed.

The present invention insures exact mathematical compliance with the requirements 1, 2 and 3 and, at the same time, furnishes economically feasible solutions based on the exact mathematical solution.

Figure 1A:
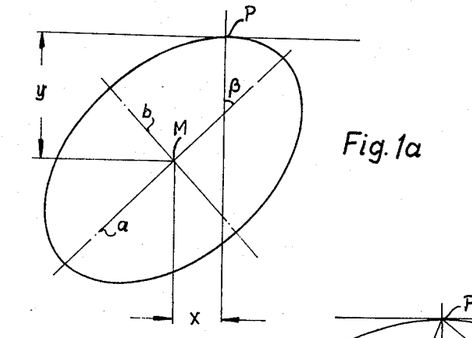
FIGS. 1a, 1b, 1c, 1d, 1e, 1f and 1g illustrate the mathematical relationships on which the invention is based.

The mathematical solution of the requirements 1 and 2 is arrived at on the basis of the following considerations (see FIG. 1a):

The cutting point P is selected as the zero point of a coordinate system, and the center point M of the elliptical blank to be treated is shifted relative to the cutting point P in the direction of the x- and y-axes as a function of rotation of the elliptical blank through the angle $\beta$ in such a way that the pitch ellipse is always tangential to the cutting point P.

The following are the equations for dependent movements. Thus, it is necessary that $$x = f(\beta, \epsilon, C) \quad 1$$

$$y = f(\beta, \epsilon, C) \quad 2$$

$$\omega\phi = f(\omega\alpha, \epsilon, \beta) \quad 3$$

$$\beta = f(\alpha, \epsilon) \quad 4$$

wherein $\beta$ = angle of rotation of the pitch ellipse relative to a line parallel to one of the axes of the coordinate system, $\epsilon$ = numerical eccentricity of the pitch ellipse, $c$ = major axis of the pitch ellipse, $\omega\alpha$ = constant angular speed of the driving machine, $\omega\phi$ = periodically variable angular speed of the center radius R of the pitch ellipse relative to the major axis of the pitch ellipse.

Figure 1B:
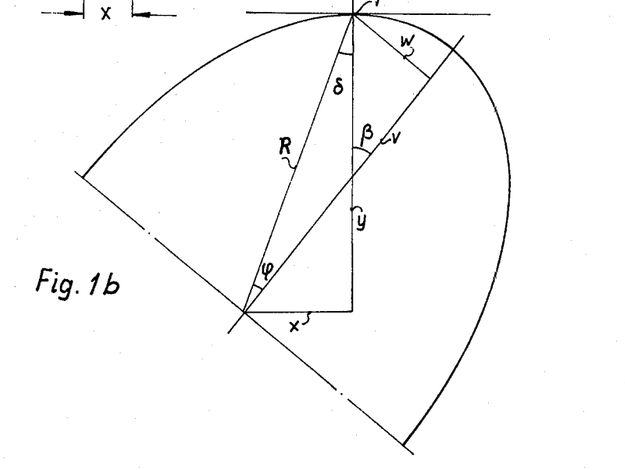

According to FIG. 1b, $$x^2 + y^2 = v^2 + w^2 \qquad (5)$$

and $$\beta = \Omega + \delta = \arctan \frac{w}{v} + \arctan \frac{x}{y}. \qquad (6)$$

As shown in FIG. 1b, $\phi$ in the equation No. 6 represents that portion of the angle $\beta$ which determines the speed of the pitch ellipse at the zero point P of the coordinate system, and $\delta$ represents that portion of the angle $\beta$ which determines the tangential position of the pitch ellipse relative to a straight line including the zero point of the coordinate system..

Figure 1C:
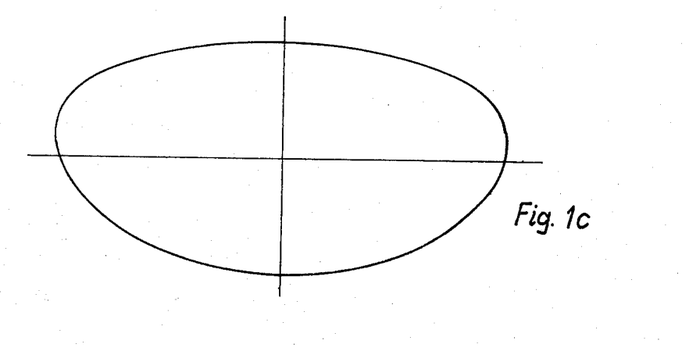

The equation for the $x$- and $y$-axes of the coordinate system can be calculated from the path of the center point of a pitch ellipse as shown in FIG. 1c. Thus, $$x = 2r_1 \sin(2\beta)[1-k\cos(2\beta)], \qquad (7)$$

$$y = a - 2r_2 \sin^2 \beta. \qquad (8)$$

Figures 1D, 1E:
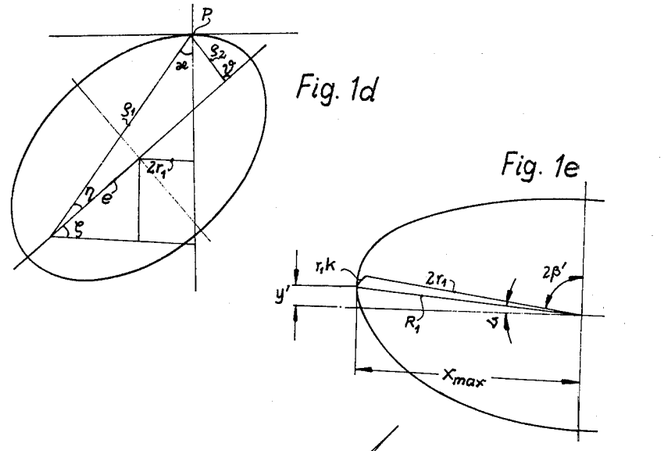

The factors $r_1$, $r_2$ and $k$ appearing in the equations Nos. 7 and 8 can be determined, according to FIGS. 1d and 1e, from the equations $$2r_1 = \rho_1 \sin 2H - e \cos \eta \qquad (9)$$

provided that $$\rho = \frac{\pi}{H} \qquad (10)$$

whereby the relationship between $\zeta$; $\eta$; $\Theta$ and H satisfies $$\zeta = \frac{\pi}{2} - \frac{\Theta + \eta}{2} \qquad (11)$$

$$H = \frac{\Theta - \eta}{2}. \qquad (12)$$

Based on the known relationship of $\rho_1/\zeta_2$, it $$r_1 = \frac{c}{4} \left[ \frac{1-\epsilon^2}{1-\epsilon\cos\eta} \sin \frac{\Theta-\eta}{2} \middle/ \sin\frac{\Theta+\eta}{2} \right] \qquad (13)$$

whereby $$\Theta = \arcsin \sin \eta \frac{1-\epsilon^2}{1+\epsilon^2-2\epsilon\cos\eta} \qquad (14)$$

The condition for calculation of $r_1$ in the equation No. 13 is that $$\Theta + \eta = \frac{\pi}{2} \qquad (15)$$

Based on the relationships observable in FIG. 1e, $k$ is determined on the basis of the equation $$k = \sqrt{4 + \left(\frac{R}{r}\right)^2 - 4\left(\frac{R}{r}\right)\sin(2\beta' + r)} \qquad (16)$$

wherein the values of $R_1$, $\beta'$, $r$ are to be calculated on the basis of the following equations, it being necessary to determine $x_{max}$ and the corresponding value $y'$:

$$R_1 = \sqrt{y'^2 = x^2_{max}} \qquad (17)$$

$$B' = \arcsin \sqrt{\frac{\frac{c}{2} - y'}{\frac{c}{2}[1 - \sqrt{1-\epsilon^2}]}} \qquad (18)$$

$$\nu = \arctan \frac{y'}{x_{max}} \qquad (19)$$

As for $r_2$, it applies that $$r_2 = \frac{c}{4}[1 - \sqrt{1-\epsilon^2}]. \qquad (20)$$

Figure 1F:
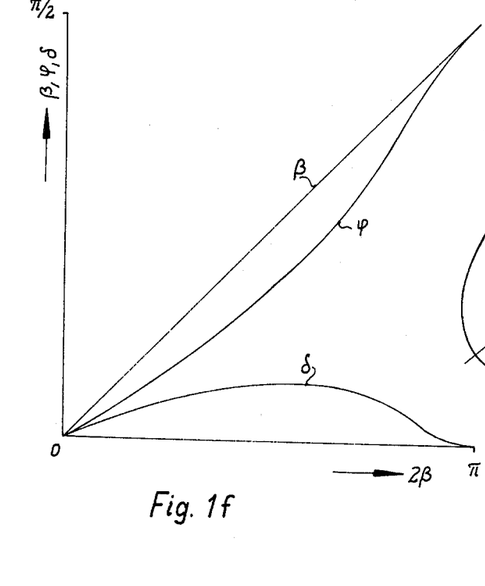

The values of $r_1$, $r_2$ and $k$ were determined on the basis of the preceding equations, substituted in the equations Nos. 7 and 8 for $x$ and $y$ and calculated with the $x$-, $y$-values $\beta$, $\Theta$. The values of $\beta$; $\phi$; $\Theta$, as furnished by a computer, indicate that the equations Nos. 7 and 8 fully meet the requirements 1 and 2. The values of $\phi$, $\Theta$, $\beta$ are shown in FIG. 1f over 2.

Figure 1G:
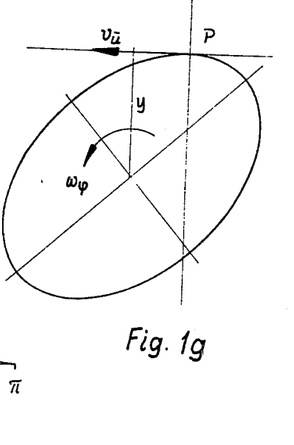

The mathematical solution of the requirement 3 is calculated according to FIG. 1g on the basis of the following condition:

$$V\bar{\mu} = y \cdot \omega\phi = \text{const.} \qquad (21)$$

whereby the following equation applies for the two axes of the pitch ellipse:

$$a \cdot ia \cdot \omega\alpha = b \cdot i_b \cdot \omega\alpha \qquad (22)$$

wherein $$i \cdot \omega\alpha = \omega\phi \qquad (23)$$

and assuming that $$i_b = \frac{1}{i_a} \qquad (24)$$

the extreme positions can be calculated as follows:

$$\omega\phi = \sqrt[4]{1 - \epsilon^2} \, \omega\alpha \qquad (25)$$

and the requirement is met for all points of the pitch ellipse if one assumes that $$\omega\phi = \frac{\sqrt[4]{1-\epsilon^2}}{1-[1-\sqrt{1-\epsilon^2}]\sin^2\beta} \qquad (26)$$

because this indicates that $$V\bar{\mu} = \frac{c}{2} \sqrt[4]{1-\epsilon^2} \cdot \omega\alpha = \text{const.} \qquad (27)$$

which fully meets the above outlined requirement 3. The equations Nos. 7, 8 and 26 solve the problem of the constant speed of the pitch ellipse and of the constant tangentiality of the pitch ellipse relative to a straight line passing through a predetermined coordinate point so that the manufacture of elliptical gears is simplified to match the manufacture of circular gears.

The values $x, y, \beta$ as a function $f(\alpha, \epsilon, c)$ which are necessary for controlling the operation of a digital gear cutting machine can be furnished directly by a positive gearing of the type described, for example, in this specification to thus solve the generally formulated equations Nos. 1, 2 and 4 without it being necessary to express them in the terms of an elementary function.

Figure 2:
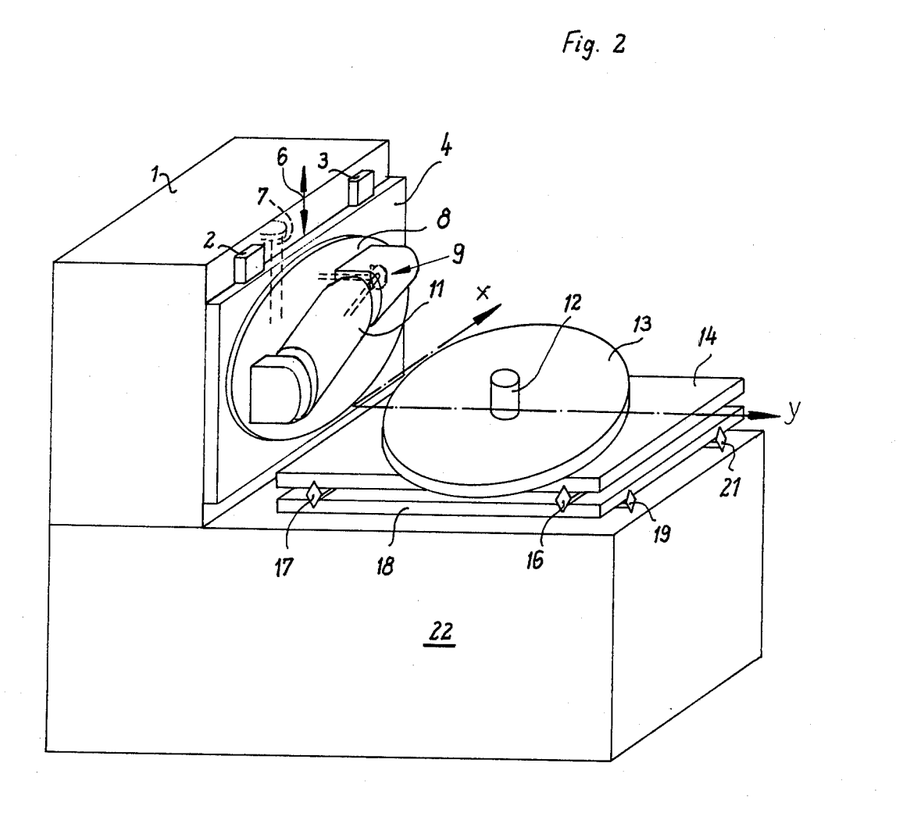
FIG. 2 is a diagrammatic perspective view of a gear cutting machine which embodies the invention.

FIG. 2 is a schematic perspective view of a gear cutting machine for the making of elliptical gears in accordance with the generating gear cutting technique.

The frame 1 of the machine supports guide rails 2, 3 for a tool slide 4 which is movable in directions indicated by a double-headed arrow 6 by a drive in the form of a feed screw 7. The tool slide 4 carries a pivotable tool holder 8 for a gear cutting tool in the form of a hob type milling cutter 11 driven by means of a bevel gear transmission 9. A work holder 12 receives an elliptical wheel-shaped blank 13 and is mounted in a first carriage 14 which is guided in ways 16, 17 of a second carriage 18 for movement in the direction of the $x$-axis of a two-dimensional coordinate system. The second carriage 18 is guided in ways 19 and 21 provided on a machine bed 22 for movement in the direction of the $y$-axis of the coordinate system.

Figure 3:
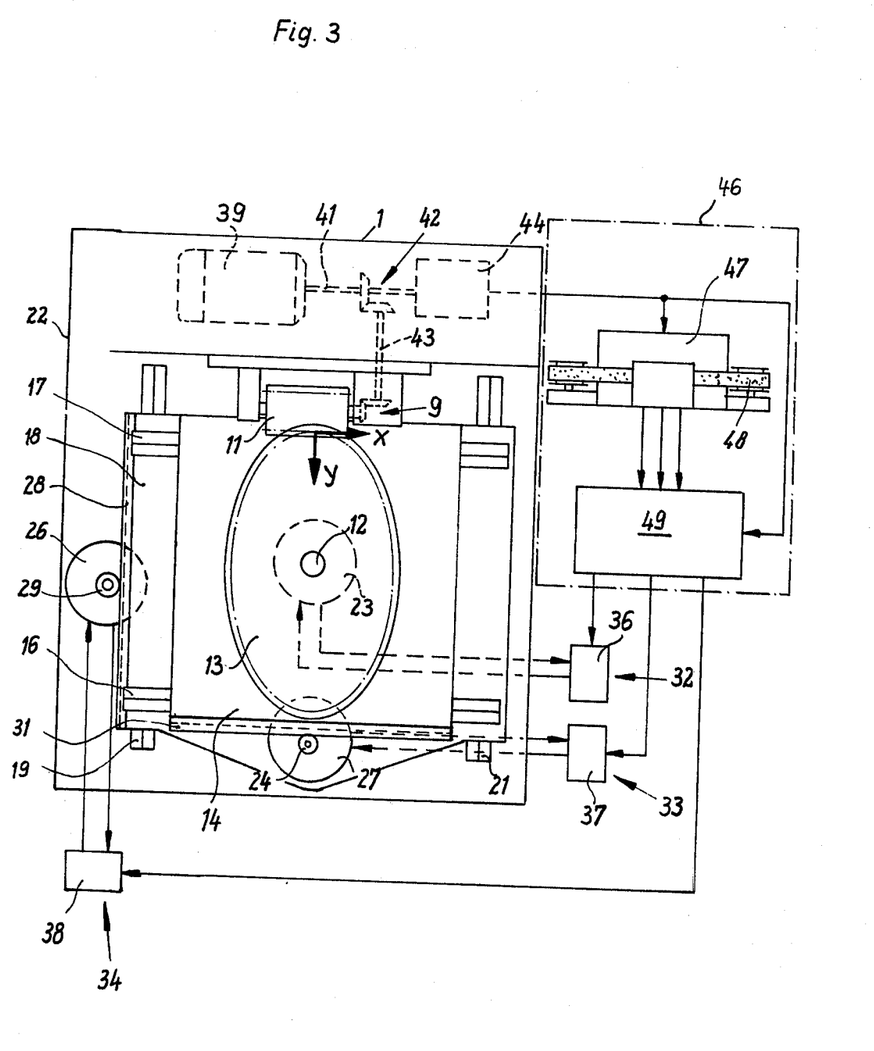
FIG. 3 is a plan view of the gear cutting machine of FIG. 2.

FIG. 3 is a plan view of a first embodiment of a driving system for rotating the work holder 12 and for changing the position of the work holder relative to the cutting tool 11. The first carriage 14 supports a first drive means here shown as a control element in the form of a step motor 23 serving to rotate the work holder 12. The first carriage 14 is further associated with a third drive means here shown as a control element in the form of a step motor 24 serving to move the first carriage 14 on the second carriage 18 in the direction of the $x$-axis of the coordinate system and to thus change the position of the work holder 12 relative to the cutting tool 11 in the direction of the $x$-axis. The second carriage 18 is associated with a second drive means here shown as a control element in the form of a step motor 26 which serves to move the second carriage 18 and the first carriage 14 thereon, together with the work holder 12, in the direction of the $y$-axis of the coordinate system to thus change the position of the work holder 12 relative to the cutting tool 11 in the direction of the $y$-axis. The step motor 24 is secured to the carriage 18 and includes a pinion 27 meshing with a toothed rack 31 secured to the carriage 14. The step motor 26 is secured to the machine bed 22 and includes a pinion 29 meshing with a toothed rack 28 which is secured to the carriage 18. The step motors 23, 24 and 26 respectively constitute control elements of control units 32, 33 and 34 which further respectively comprise comparing elements 36, 37, 38 (e.g., in the form of counters). Such digitally controlled drives (customary in the machine tool construction) render it possible to control the angular and translatory movements of the elliptical blank with tolerances in the micro region. A prime mover of the machine, in the form of a constant-speed electric motor 39, is kinematically connected with the bevel gear transmission 9 for the cutting tool 11 by means of a first shaft 41, a bevel gear transmission 42 and a second shaft 43. A reader 47 which reads a program carrier in the form of a perforated tape 48 is connected with an angle detecting unit 44 driven by the motor 39. The output of the reader 47 is connected with a storage 49 which is connected with the angle detecting unit 44. The storage 49 is further connected with comparing elements 36, 37 and 38 of the control units 32, 33, 34.

The operation of the gear cutting machine of FIGS. 2 and 3:

The perforated tape 48 carries a program in accordance with the mathematical relationships discussed in connection with FIGS. 1a-1g and serves to regulate the step motors 23, 24 and 26. The electric motor 39 drives the cutting tool 11 so that the latter performs its material removing movements whereby the tool 11 is driven simultaneously with the feed screw 7 which moves the tool slide 4 in order to feed the tool against the workpiece. The angle detecting unit 44 furnishes to the reader 47 signals indicating the extent of angular movement of the shaft 41 which is driven by the motor 39. Depending on such signals, the perforated tape 48 is moved by the reader 47 whereby the latter furnishes corresponding signals to the storage 49. Initiated by signals furnished by the angle detecting unit 44--but with a delay of one angular step relative to the output signals furnished by the reader 47--the storage 49 transmits such signals as rated values in the form of digital signals to the comparing elements 36, 37 and 38 of the control units 32, 33 and 34, whereby the step motors 23, 24 and 26 are regulated, depending on the momentary deviations, in such a way that the elliptical blank 13 which is supported by the work holder 12 rotates at a periodically varying angular speed depending on its numerical eccentricity, that the pinion 27 and the rack 31 move the carriage 14 back and forth in the direction of the $x$-axis of the coordinate system depending on the length of the major axis of the elliptical blank 13 and its numerical eccentricity, and that the carriage 18 is moved back and forth in the direction of the $y$-axis of the coordinate system by the pinion 29 and rack 28 also depending on the length of the major axis and numerical eccentricity of the elliptical blank 13. Due to the possibility of programming the computer 46 by means of the discovered mathematical relationships for the path along which the center of the ellipse must move during the cutting of gear teeth, the pitch ellipse of the elliptical blank 13 passes at a constant speed through the contact point with the pitch line of the cutting tool 11 and the position of the elliptical blank is changed in synchronism therewith in such a way that the pitch ellipse of the elliptical blank 13 is always tangential to the pitch line of the cutting tool 11 at the point of contact. This renders it possible to form the teeth on the elliptical blank 13 with the same degree of accuracy and of the same quality as on a circular gear.

Figure 4:
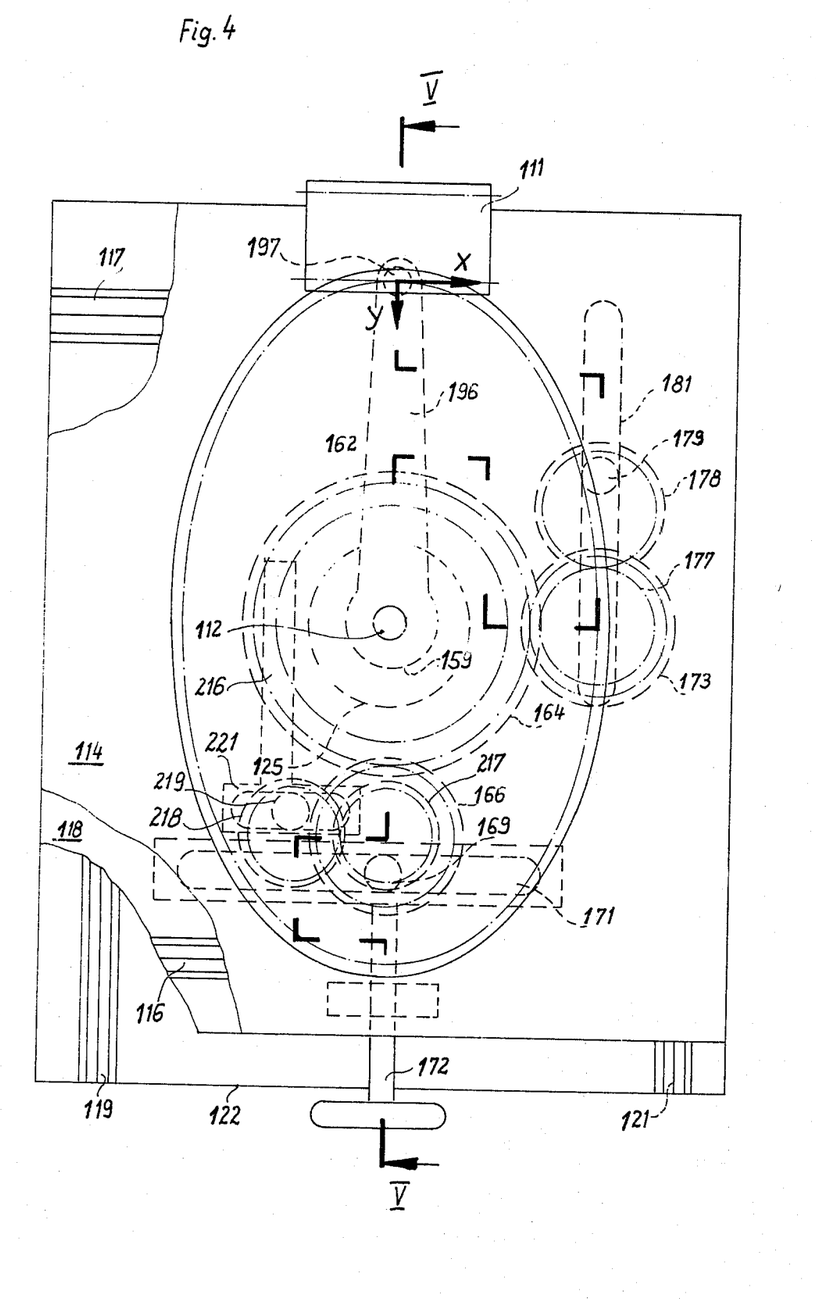
FIG. 4 is a plan view of a modified gear cutting machine.
Figure 5A:
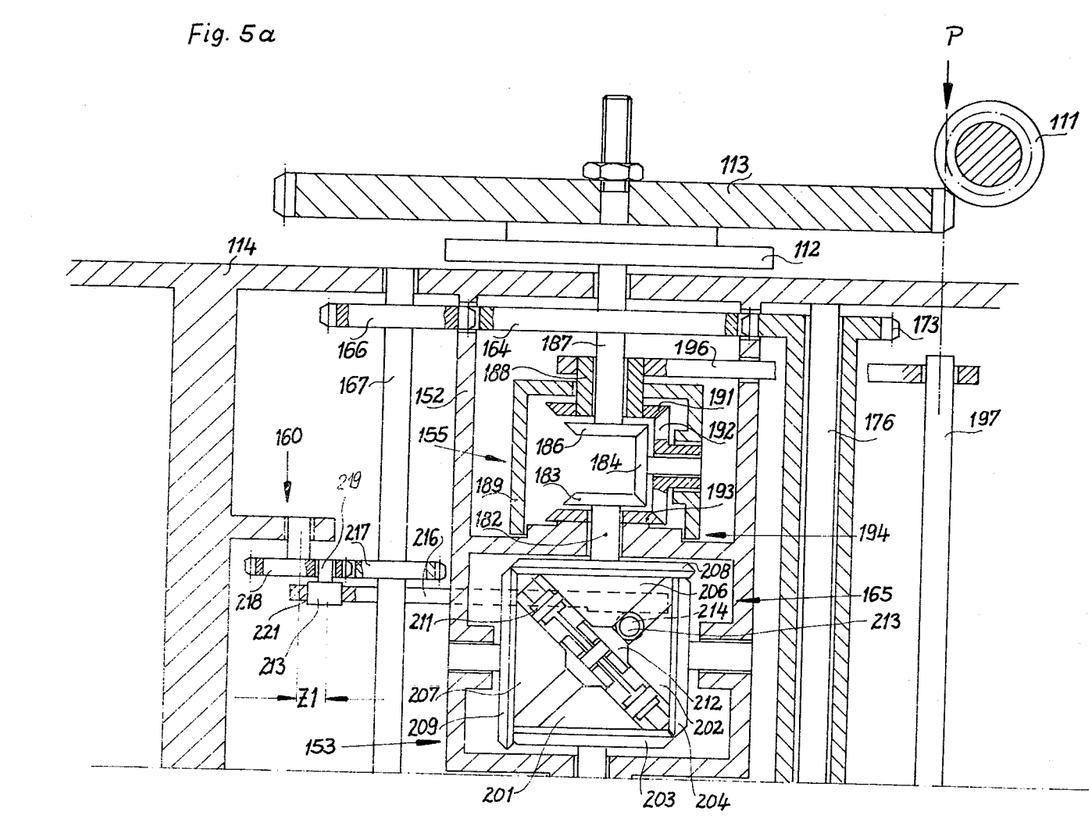
FIGS. 5a and 5b are a sectional view as seen in the direction of arrows from the line V—V of FIG. 4.
Figure 5B:
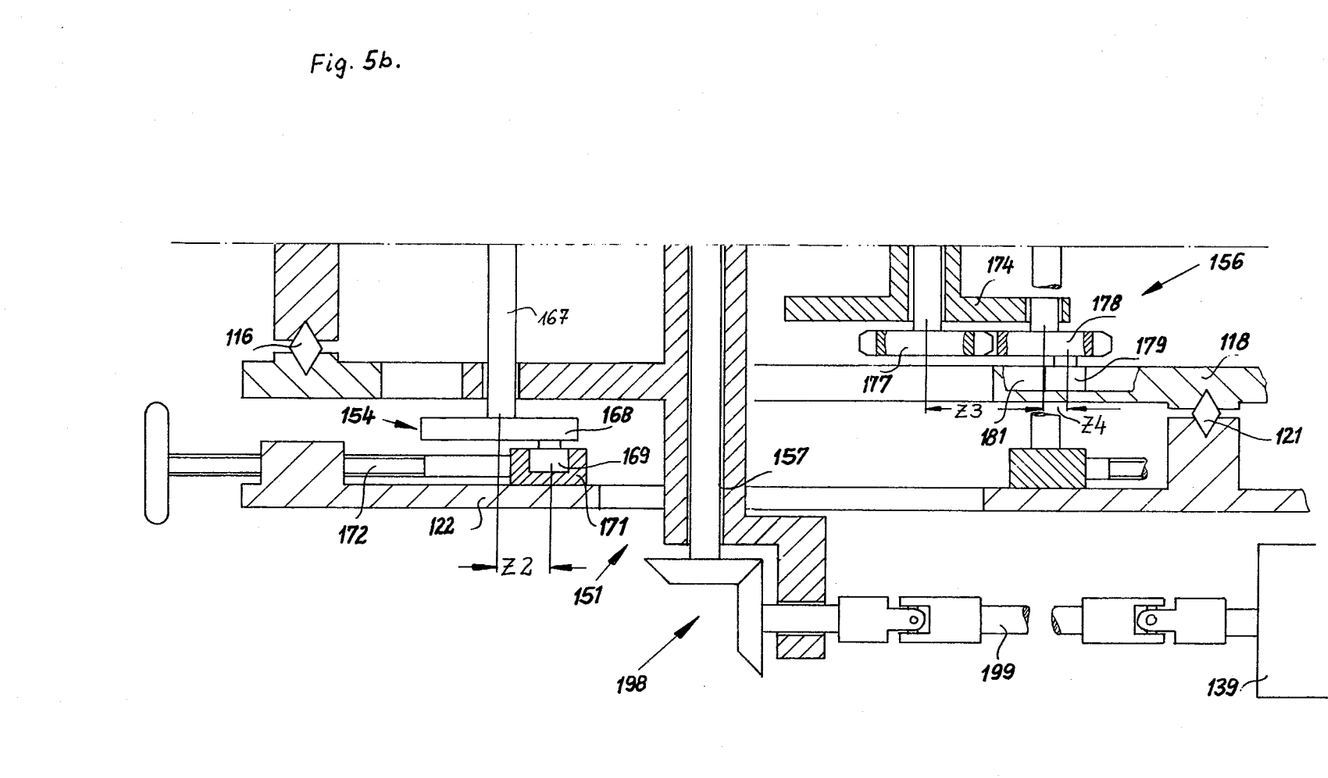

FIGS. 4, 5a and 5b illustrate a modified gear cutting machine having a positive mechanical transmission for rotating the work holder and for moving the two carriages. FIG. 4 is a plan view of the two carriages and of the schematically indicated positive drive, and FIGS. 5a and 5b illustrates the details of the positive drive in a section taken along the line V—V of FIG. 4. The parts which correspond to those shown in FIGS. 2 and 3 are denoted by similar reference characters plus 100.

The work holder 112 which carries the elliptical blank 113 to be treated is mounted in the first carriage 114. The positive mechanical transmission 151 is mounted in a gear case 152 which is secured to the first carriage 114 and the transmission 151 includes first drive means here shown as a first partial drive in the form of an infinitely variable speed gearing 153 serving to rotate the work holder 112, a second drive means here shown as a second partial drive in the form of an eccentric gearing 154 serving to move the second carriage 118 with the first carriage 114, a third drive means here shown as a third partial drive in the form of a planetary 156 serving to move the first carriage 114 relative to the second carriage 118, a compensating gearing 155 which is associated with the work holder 112 and serves to control the angular movements of the work holder 112 in dependency on changes in the latter's position relative to the cutting tool 111, and an eccentric drive 160 for an adjuster 165 associated with the infinitely variable speed gearing 153.

The infinitely variable speed gearing 153 is a conventional Kladek-transmission. It comprises a driver shaft 157 for a bevel gear 201 having specially configurated teeth. A similar bevel gear 202 is mounted in the case 152 and is driven at the speed of the bevel gear 201 by way of auxiliary bevel gears 203 and 204. The bevel gear 202 is positioned in such a way that a tooth of the bevel gear 201 registers with a tooth space of the bevel gear 202. An identical system of bevel gears is mounted on a shaft 182 and includes two driven bevel gears 206, 207 and two auxiliary bevel gears 208, 209. A radially movable intermediate gear 211 is mounted between the differential-like specially toothed bevel gears 201, 202 on the one hand and bevel gears 206, 207 on the other hand. The intermediate gear 211 is a divided gear and its periphery carries a number of equidistant steel lamellae which face the bevel gears 201, 202, 206, 207 in both axial directions and form a sort of plastic teeth. The intermediate gear 211 is movable by way of a toothed rack 212 and pinion 213 from the adjuster 165 which latter includes a pinion 214 and a toothed rack 216.

The shaft 182 is connected with a gear 164 by way of the compensating gearing 155. The gear 164 is rigid with the work holder 112 and meshes with a gear 166 secured to a shaft 167 which is journalled in the first carriage 114 and gear case 152. The transmission ratio of the gears 164 and 166 is 2:1. The shaft 167 carries a spur gear 217 which meshes with a gear 218 mounted in the first carriage 114 and forming part of the first eccentric drive 160. The ratio of the gears 217, 218 is 1:1. The gear 218 carries an eccentric 219 whose eccentricity is shown at Z1 and which is movable in a guide 221 of the toothed rack 216 forming part of the adjuster 165. Furthermore, the shaft 167 carries an eccentric disk 168 of the eccentric gearing 154, and the disk 168 carries an eccentric pin 169 whose eccentricity is indicated at Z2. The pin 169 is movable in a guide 171 of the machine bed 122. The guide 171 is adjustable by a feed screw 172 which is mounted in the bed 122 so that the guide 171 can change its position in the direction of the y-axis relative to the starting position of carriages 114, 118 with reference to the cutting tool 111.

The gear 164 of the gearing 153 further meshes with a gear 173, and the ratio of gears 164, 173 is 2:1. The gear 173 is connected with a planet carrier 174 and is mounted on a shaft 176 secured to the first carriage 114. The shaft 176 carries a sun gear 177 meshing with a planet pinion 178 which is mounted on the planet carrier 174. The planet pinion 178 can roll about the sun gear 177. The planet carrier 174 and its pinion 178 constitute an eccentric drive wherein the pinion 178 constitutes an eccentric. The eccentricity Z3 of the planet pinion 178 relative to the axis of the planet carrier 174 is variable. The planet pinion 178 carries an eccentric pin 179 whose eccentricity is indicated at Z4 and which is movable in a guide 181 of the second carriage 118.

The shaft 182 extends into the compensating gearing 155 and is rigid with a bevel gear 183 forming part of a differential which further includes bevel gears 184 and 186. The bevel gear 186 is secured to a shaft 187 of the gear 164 and work holder 112. The shaft 187 extends through a hollow shaft 188 which is mounted in a gear casing 189. The hollow shaft 188 is rigid with a further gear 191 which forms part of a second differential including two additional bevel gears 192, 193. The bevel gear 192 is mounted in the gear casing 189 and carries the aforementioned bevel gear 184. The bevel gear 193 is mounted against rotation and serves as a means for rotatably supporting the shaft 182. The gear casing 189 is rotatable in a socket 194.

A lever 196 is connected against rotation with the hollow shaft 188 and is of variable length to articulately connect the compensating gearing 155 to a stationary shaft 197 located below the cutting point P. The shaft 157 can be driven by the electric motor 139 through the intermediary of a variable-length Cardan shaft 199 and a pair of bevel gears 198. The motor 139 further drives the cutting tool 111 in a manner not shown but corresponding to that described in connection with FIGS. 2 and 3. For the formation of teeth on elliptical gears having any desired numerical eccentricity and major axes of varying lengths, the eccentricities Z1, Z2, Z3 and Z4 are calculated on the basis of mathematical equations outlined in connection with FIG. 1 as follows:

$$Z1 = r_o \; [1 - \sqrt{1-\epsilon^2}],$$
$$Z2 = \frac{c}{4} [1 - \sqrt{1-\epsilon^2}],$$
$$Z3 = 2r_1,$$
$$Z4 = k \cdot r_1,$$

wherein $r_o$ is the radius of the pitch circle of the gear 218 and $r_1$ and $k$ are calculated on the basis of equations Nos. 13 and 16.

The eccentrics 219, 169 and 179 are adjustably mounted on the gear 218, eccentric disk 168 and the planet pinion 178, respectively. However, it is also possible to replace the eccentrics 219, 169 and 179 together with the gear 218, eccentric disk 168 and planet pinion 178, respectively.

The operation of the positive mechanical transmission according to FIGS. 4, 5a and 5b:

The prime mover 139 of the machine drives the shaft 157 of the gearing 153, and hence the bevel gears 201, 203, 204 and 202, at a constant angular speed by way of the Cardan shaft 199 and bevel gears 198. The bevel gears 201 and 202 drive the bevel gears 206, 207 by way of the intermediate gear 211 whereby the gears 206, 207 drive the bevel gears 208 and 209. The gear 164 is driven by the compensating gearing 155 whereby the gear 164 drives the eccentric gearing 160 by way of the gear 166, shaft 167 and gear 217. The eccentric 219 moves the toothed rack 216 back and forth whereby the rack 216 moves the intermediate gear 211 by way of the pinions 214, 213 and toothed rack 212 in dependency on eccentricity Z1 of the eccentric 219. Consequently, the constant RPM of the shaft 157 is converted into an irregular angular speed of the shaft 182 and work holder 112 (by way of the compensating gearing 155 and shaft 187). The gear 164 which is driven at a varying speed drives the eccentric disk 168 of the gearing 154 by way of the gear 166. Depending on the eccentricity Z2 of the eccentric 169 on the disk 168 (eccentric 169 moves in the guide 171 secured to the bed 122 by the feed screw 172), the carriages 114 and 118 move in the ways 119, 121 back and forth in the direction of the y-axis. Due to the transmission ratio of gears 164 and 166, the carriage 118 completes two back-and-forth movements during each revolution of the tool holder 112.

The gear 164 which rotates at a varying speed drives the gear 173 and thus the planet carrier 174 of the planetary 156. The planet pinion 178 which is mounted on the planet carrier 174 rolls along the sun gear 177 whereby the carriage 114 moves back and forth relative to the carriage 118 in the direction of the x-axis along the ways 116, 117. The movements of the carriage 114 are determined by the eccentricity Z3 of the planet pinion 178 relative to the planet carrier 174 and the eccentricity Z4 of the eccentric 179 relative to the planet pinion 178. The eccentric 179 is coupled with the guide 181 of the carriage 118. Due to the aforementioned ratio of gears 164 and 173, the carriage 114 completes two back-and-forth movements during each revolution of the work holder 112. As a result of reciprocatory movements of the carriages 114 and 118, the elliptical blank 113 moves back and forth along the tool 111 so that the pitch line of the elliptical blank 113 would have to travel along the contact point P with the pitch line of the tool 111 at a speed which is determined by the adjustable gearing 153 and a superimposed speed determined by the reciprocatory movements of the carriages 114, 118.

This is prevented by the compensating gearing 155 because, when the work holder 112 changes its position, the lever 196 is pivoted on the shaft 197 whereby the bevel gear 191 and 192 (the latter of which rolls along the fixed bevel gear 193) cause the casing 189 and the bevel gear 184 to turn therewith. The bevel gear 184 thereby rolls along the driven bevel gear 183 and transmits to the work holder 112 a further movement by way of the bevel gear 186 and shaft 187. Since the aforementioned eccentricities Z1, Z2, Z3 and Z4 can be calculated with a high degree of accuracy on the basis of the aforediscussed mathematical relationships dealing with the path for the center of the elliptical blank 113 during the formation of gear teeth, the pitch ellipse of the elliptical blank 113 travels at a constant speed along the contact point with the pitch line of the tool 111 and the position of the elliptical blank 113 is changed synchronously in such a way that the pitch ellipse of the blank 113 invariably remains tangential to the pitch line of the tool 111 at the point of contact of the tool with the blank. This insures that the positive mechanical transmission of FIGS. 4, 5a and 5b is capable of forming teeth on an elliptical blank with the same degree of accuracy and of the same quality as on circular gear blanks.

Figure 6:
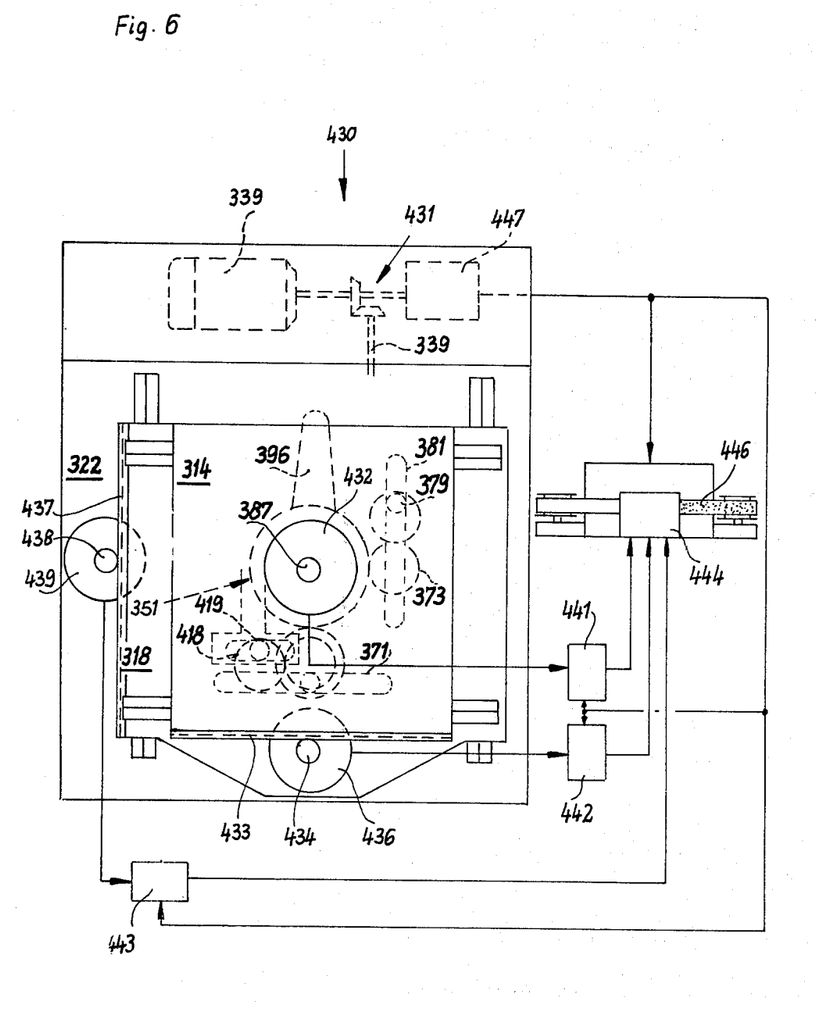
FIG. 6 shows a mechanical computer for supplying rated value signals in digital form.

FIG. 6 illustrates a mechanical computer 430 which furnishes rated value signals in digital form. The computer 430 includes a transmission 351 which is a smaller-scale version of the positive mechanical transmission 151 shown in FIGS. 4, 5a and 5b. Therefore, all details of the transmission 351 are not shown in FIG. 6; all such parts of the transmission 351 which are identical with or clearly analogous to the corresponding parts of the transmission 151 are denoted by similar reference characters plus 200.

The electric motor 339 transmits torque to the transmission 351 by way of a Cardan shaft 399 and bevel gears 431. The transmission 351 drives a first measured value register 432, the first carriage 314, a second measured value register 436 (by way of a toothed rack 433 on the carriage 314 and a pinion 434 which meshes with the rack 433), the second carriage 318 and a third measured value register 439 (by way of a toothed rack 437 on the carriage 318 and a pinion 438 which meshes with the rack 437). The registers 432, 436 and 439 are connected to a data supplying unit 444 by way of analog-digital converters 441, 442 and 443, respectively. The unit 444 transmits information to a program carrier 446. The electric motor 339 drives an angle detecting unit 447 which is connected with the data supplying unit 444 and with the analog-digital converters 441, 442, 443.

The operation of the computer shown in FIG. 6 is as follows:

The electric motor 339 drives the bevel gears 431 which rotate the Cardan shaft 399 so that the latter drives the transmission 351. The parts of the transmission 351 drive the shaft 387 which corresponds to the shaft 187 serving to drive the holder 112 of FIG. 5a. The transmission 351 further drives the carriages 314 and 318 so that these carriages perform reciprocatory movements in the directions of X- and y-axes. The toothed racks 433 and 437 respectively rotate the pinions 434 and 438 of the registers 436 and 439. The signals furnished by the registers 432, 436 and 439 are converted into digital signals by the converters 441, 442 and 443 in response to signals which are furnished to the converters 441-443 by the angle detecting unit 447 in synchronism with operation of the transmission 351. The signals are transmitted to the data supplying unit 444 which also receives signals from the angle detecting unit 447 in synchronism with operation of the transmission 351, and the data furnished by the unit 444 are stored on the program carrier 446. The latter is then used to control the operation of the machine shown in FIGS. 2 and 3.

An advantage of the improved method and machine is that they render it possible to form on an elliptical gear blank gear teeth with a high degree of accuracy. The gear cutting machine, especially if provided with the positive transmission of FIGS. 4, 5a and 5b, renders it possible to produce elliptical gears at a cost which does not exceed the cost of round gears. In the improved gear cutting machine, the circle is one specific form of the ellipse, i.e., proper programming and proper selection of eccentricities enable the machine to cut gear teeth on circular gear blanks. The improved machine can be used for cutting gear teeth by hobbing or in accordance with the gear shaping technique.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended:

1. A method of forming gear teeth on elliptical blanks whose configuration is determined by the length of the major axes and the numerical eccentricities thereof, comprising the steps of driving a gear cutting tool so that said tool performs exclusively material removing movements; rotating an elliptical blank at a periodically varying angular speed; supporting said elliptical blank for movement along each axis of a two dimensional coordinate system; and changing the position of said blank relative to said tool in synchronism with said angular speed thereof along a path of coordinates of the axes of said two-dimensional coordinate system so that the pitch ellipse of said blank travels at a constant speed along the point of contact with a pitch line of said tool and that said pitch line is always tangential to said pitch ellipse at said point of contact.

2. A method as defined in claim 1, wherein said step of rotating said blank comprises converting a driving rotary movement at a constant angular speed into a rotary movement at said periodically varying angular speed in accordance with the equation $$\omega\phi = \frac{\sqrt{1-\epsilon^2}}{1-[1-\sqrt{1-\epsilon^2}]\sin^2\beta}\omega\alpha,$$

wherein $\omega\phi$ is said periodically varying angular speed, $\omega\alpha$ is said rotary movement at said constant angular speed, $\epsilon$ is the numerical eccentricity of said blank, and $\beta$ is the angle between the major axis of said blank and a line which is normal to said pitch line.

3. A method as defined in claim 2, wherein one axis of said coordinate system is normal to and the other axis of said coordinate system is parallel with said pitch line of said tool, said steps of changing the position of said blank relative to said one axis and said other axis respectively satisfying the equations $$y = \frac{c}{2}(1-[1-\sqrt{1-\epsilon^2}]\sin^2\beta).$$

and $$x = 2 r_1 \sin(2\beta)[1 - k \cos(2\beta)],$$

wherein $y$ is said one axis, $x$ is said other axis, $c$ is the length of the major axis of said blank, and $r_1$ equals $$\frac{c}{4}\left[\frac{1-\epsilon^2}{1-\epsilon\cos\eta}\sin\frac{\theta-\eta}{2} - \sin\frac{\theta+\eta}{2}\right]$$

wherein $$\theta = \arcsin\sin\eta \ \frac{1-\epsilon^2}{1+\epsilon^2-2\epsilon\cos\eta} \text{ and } \theta+\eta = \frac{\pi}{2}.$$

4. A method as defined in claim 1, wherein said step of rotating said blank comprises mechanically converting a driving rotary movement at a constant angular speed into a rotary movement at a periodically varying angular speed, and mechanically converting said last mentioned rotary movement into straight-line movements which are utilized to cause said blank to rotate and to change its position relative to said tool.

5. A method as defined in claim 1, wherein said steps of rotating and changing the position of said blank are carried out in response to rated value signals in digital form.

6. A method as defined in claim 5, wherein said signals are furnished by a computer in the form of a transmission.

7. A machine for cutting gear teeth on elliptical gear blanks whose configuration is determined by the length of the major axes and the numerical eccentricities thereof, comprising a cutting tool; means for driving said cutting tool so that said tool performs exclusively material removing movements; a mobile work holder arranged to support an elliptical blank; means for rotating said work holder at a periodically varying angular speed; means supporting said elliptical blank for movement along each axis of a two-dimensional coordinate system; and means for changing the position of said work holder relative to said tool in synchronism with said angular speed along a path of coordinates of the axis of said two-dimensional coordinate system so that the pitch ellipse of a blank on said work holder travels at a constant speed along the point of contact with a pitch line of said tool and said pitch line is always tangential to said pitch ellipse at said point of contact.

8. A machine as defined in claim 7, wherein said means for rotating said work holder comprises a prime mover, a member rotated by said prime mover at a constant angular speed, and a driving device having means for converting the rotary movement of said member into a rotary movement at said periodically varying angular speed in accordance with the equation $$\omega\phi = \frac{\sqrt{1-\epsilon^2}}{1-[1-\sqrt{1-\epsilon^2}]\sin^2\beta}\omega\alpha,$$

wherein $\omega\phi$ is said periodically varying angular speed, $\omega\alpha$ is said rotary movement at said constant angular speed, $\epsilon$ is the numerical eccentricity of the elliptical blank on said work support, and $\beta$ is the angle between the major axis of the blank on said work holder and a line which is normal to said pitch line.

9. A machine as defined in claim 8, wherein one axis of said coordinate system is normal to and the other axis of said coordinate system is parallel with said pitch line of said tool, said means for changing the position of said work holder relative to said cutting tool comprising second and third driving means for respectively moving said work holder in the direction of said one and said other axis at a speed satisfying the equations $$y = \frac{c}{2}(1 - [1 - \sqrt{1-\epsilon^2}]\sin^2\beta) \text{ and}$$
$$x = 2r_1\sin(2\beta)[1 - k\cos(2\beta)].$$

wherein $y$ is said one axis, $x$ is said other axis, $c$ is the length of the major axis of the elliptical blank on said work support, and $r_1$ equals $$\frac{c}{4}\left[\frac{1-\epsilon^2}{1-\epsilon\cos\eta}\sin\frac{\Theta-\eta}{2} - \epsilon\sin\frac{\Theta+\eta}{2}\right]$$

wherein $\Theta = \arcsin \sin \eta$ $$\frac{1-\epsilon^2}{1+\epsilon^2-2\epsilon\cos\eta} \text{ and } \Theta + \eta = \frac{\pi}{2}.$$

10. A machine as defined in claim 7, further comprising a first carriage rotatably supporting said work holder and a second carriage movable in the direction of one axis of said coordinate system and having means supporting said first carriage for movement in the direction of the other axis of said coordinate system, said means for rotating said work holder being mounted on said first carriage and said means for changing the position of said work holder comprising means for moving said second carriage with said first carriage and means for moving said first carriage relative to said second carriage.

11. A machine as defined in claim 10, further comprising a bed having means supporting said second carriage for movement in the direction of said one axis of said coordinate system.

12. A machine as defined in claim 7, wherein said means for rotating said work holder comprises a first drive means and said means for changing the position of said work holder comprises second and third drive means respectively arranged to move said work holder in the direction of one and the other axis of said coordinate system, and further comprising first, second and third control units responsive to rated value signals in digital form and respectively comprising first, second and third adjusting elements which respectively constitute said first, second and third drive means.

13. A machine as defined in claim 12, further comprising a program carrier and means for transmitting said signals from said program carrier to said control units.

14. A machine as defined in claim 13, further comprising mechanical computer means having data supplying means for said program carrier.

15. A machine as defined in claim 14, wherein said computer means comprises a transmission having measured value registers connected with said data supplying means.

16. A machine as defined in claim 7, wherein said means for rotating and changing the position of said work holder comprise a prime mover, a positive mechanical transmission driven by said prime mover including first, second and third kinematically interconnected drive means for respectively rotating said work holder, for moving said work holder in the direction of one axis of said coordinate system, and for moving said work holder in the direction of the other axis of said coordinate system.

17. A machine as defined in claim 16, further comprising a first carriage movable in the direction of said one axis by said second drive and a second carriage mounted on said first carriage and movable by said third drive in the direction of said other axis, said work holder being rotatably mounted on said second carriage and said first drive comprising an infinitely variable speed gearing mounted on said second carriage and having a rotary output member kinematically connected with said work holder.

18. A machine as defined in claim 17, wherein said first carriage comprises a guide and said third drive comprises a planetary mounted in said second carriage and having a fixed sun gear and a planet pinion meshing with said sun gear, said planet pinion having an eccentric extending into said guide.

19. A machine as defined in claim 17, further comprising a bed movably supporting said first carriage and having a guide, said second drive comprising an eccentric gearing mounted in said second carriage and having an eccentric extending into said guide.

20. A machine as defined in claim 19, wherein said positive mechanical transmission further comprises an eccentric drive associated with said first drive and operated by said second drive, and an adjuster for changing the speed ratio of said first drive, said adjuster being connected with said eccentric drive.

21. A machine as defined in claim 17, wherein said positive mechanical transmission further comprises a compensating gearing drivingly connected with said work holder and having means for regulating the speed of rotary movement of said work holder as a function of changes in the position of said work holder relative to said cutting tool.

22. A machine as defined in claim 17, further comprising a bed for movably supporting said first carriage, said bed having a guide and each of said drives comprising at least one eccentric of variable eccentricity, said eccentric of said second drive extending into said guide and further comprising means for adjusting the distance between said guide and said cutting tool.

* * * * *